(No Model.) 2 Sheets—Sheet 1.

N. JOHNSON.
ABSORBER FOR AMMONIA REFRIGERATING AND ICE MAKING APPARATUS.

No. 469,945. Patented Mar. 1, 1892.

WITNESSES. INVENTOR.

(No Model.) 2 Sheets—Sheet 2.
N. JOHNSON.
ABSORBER FOR AMMONIA REFRIGERATING AND ICE MAKING APPARATUS.
No. 469,945. Patented Mar. 1, 1892.
Fig. 3.
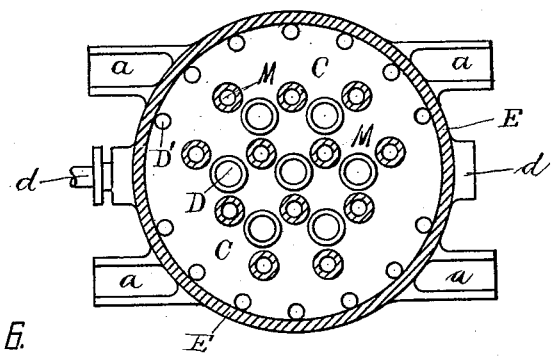
Fig. 6.
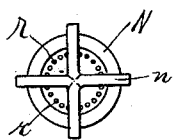
Fig. 4.
Fig. 7.
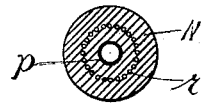
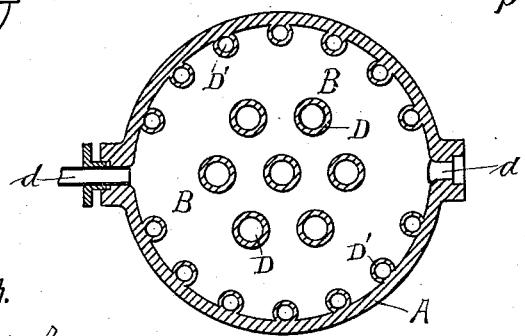
Fig. 8.
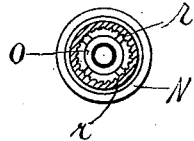
Fig. 5.
Fig. 9.
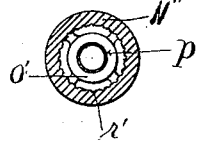
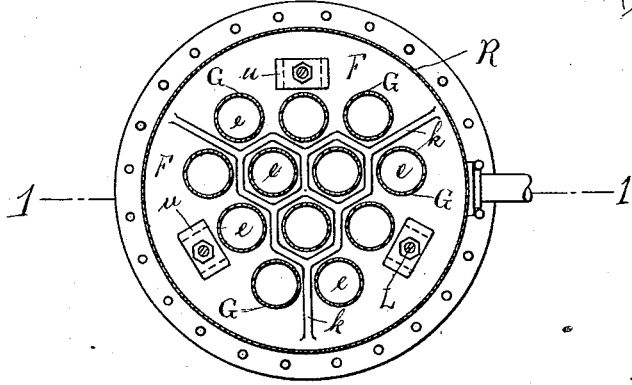
WITNESSES.
Jos. W. Crosley
Wm. M. Byrne
INVENTOR.
Nils Johnson, by
Paul Bakewell
his attorney

UNITED STATES PATENT OFFICE.

NILS JOHNSON, OF ST. LOUIS, MISSOURI.

ABSORBER FOR AMMONIA-REFRIGERATING AND ICE-MAKING APPARATUS.

SPECIFICATION forming part of Letters Patent No. 469,945, dated March 1, 1892.

Application filed February 9, 1891. Serial No. 380,767. (No model.)

*To all whom it may concern:*

Be it known that I, NILS JOHNSON, a citizen of the United States, residing in the city of St. Louis and State of Missouri, have invented certain new and useful Improvements in Absorbers for Ammonia-Refrigerating and Ice-Making Apparatus, of which the following is a full, clear, and exact description.

My invention relates to improvements in apparatus in ammonia-refrigerating machines in which the principle of absorption is employed, whereby and wherein the expanded gas is brought into the presence of the weak ammonia-liquor by which it is absorbed.

It has for its object the production of an apparatus for the purposes described, in the operation of which, first, the free flow of the expanded gas from the refrigerating-coils, where it does its work of refrigeration by expansion, is assisted rather than impeded; second, the largest possible surfaces of the expanded gas and of weak liquor are brought in contact with each other, thereby effecting a maximum saturation of the weak liquor, and, third, any residual unexpended latent heat in the expanded gas otherwise wasted shall be utilized in cooling the saturated solution and the weaker liquor, thereby increasing its power to absorb the expanded gas, and in construction to be designed so as to be conveniently taken apart and the several parts kept thoroughly cleaned—a desideratum of practical importance. How I accomplish these objects will be better understood by the following specification, in which, in connection with the drawings herewith, I describe my improved absorber and the operation thereof, the essential features of novelty and improvement thereof being more specifically pointed out in the claims.

Figure 1:
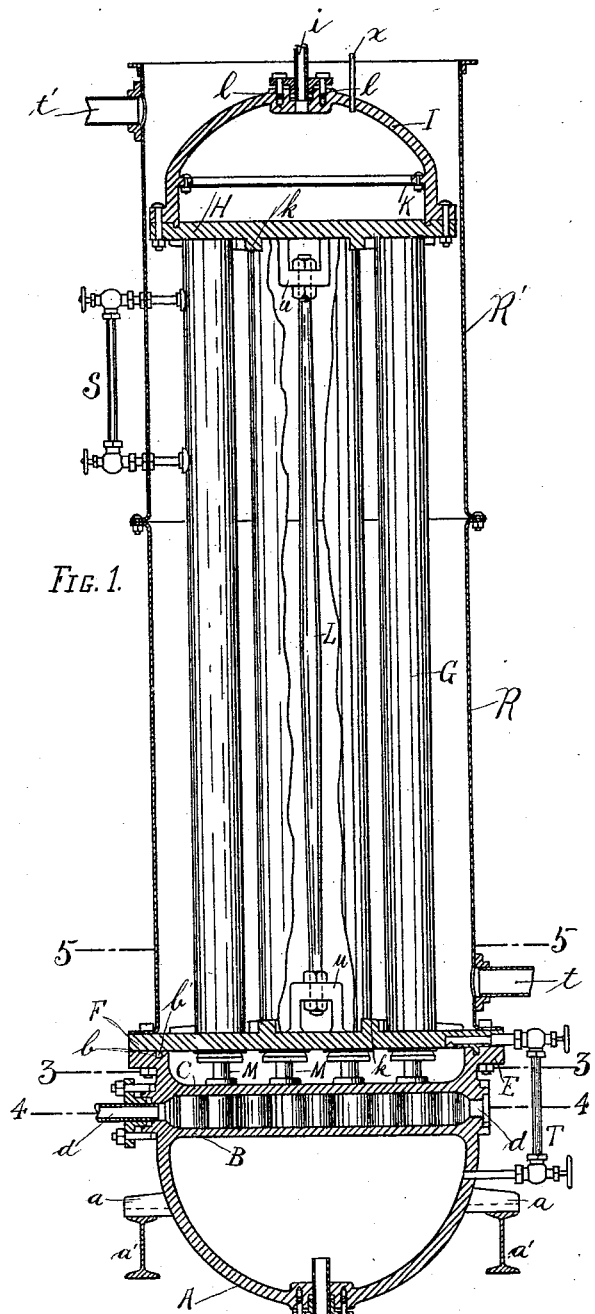
Figure 2:
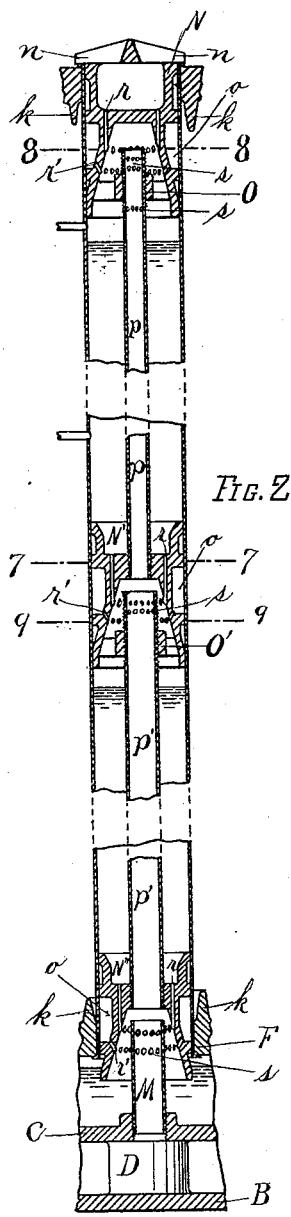

In the accompanying drawings, in which like letters of reference denote like parts in the several views, Figure 1 is a vertical central section of my newly-invented absorber, taken as on the line 1 1 in Fig. 5. Fig. 2 is an enlarged longitudinal section of one of the vertical tubes and accompanying parts hereinafter described. Figs. 3, 4, and 5 are cross-sections taken, respectively, on the lines 3 3, 4 4, and 5 5 in Fig. 1. Figs. 6, 7, 8, and 9 are respectively a plan view of the obstruction-plugs hereinafter described and cross-sections, taken as on the lines 7 7, 8 8, and 9 9 in Fig. 2.

In designing my improved absorber I have sought to take advantage of the natural tendency of the ammonia-gas to rise and of a liquid to seek a lower level, if permitted to do so. For this reason in my absorber I lead the expanded gas to the lower portion thereof and conduct the weak liquor to the upper portion, providing means for preventing the gas and the liquor from intermingling, except at desired points, at which points they are brought in contact with each other to the best possible advantage. I intend to use my absorber in connection with a generator or retort in which the gas is generated by heat from the strong liquor, an analyzer or separator whereby the gas is freed from any aqueous vapor it may contain, a condenser wherein the gas is reduced to a liquid form by pressure and by being cooled, refrigerating-coils or other devices, in which devices the condensed gas is allowed to expand and do its work of refrigeration, a pump for forcing the strong liquor into the generator, purging devices for freeing the apparatus of air, connecting-pipes, valves, and gages, all apparatus necessary to the operation of a refrigerating or ice-making plant and well known in the art; and, as my invention relates only to the absorber, I have confined my description and illustrations to the absorber alone.

How I construct my improved absorber will be understood by the following description of its several parts, reference being had to the accompanying drawings.

A represents a hemispherically-formed base-casting, (see Figs. 1 and 4,) which supports the whole apparatus by having lugs *a* formed in the same, designed to rest on convenient supports, as the girders *a'*. This casting A is formed with two diaphragms or heads B and C, somewhat removed from each other and extending across the wide or diametrical portion of the casting. (See Fig. 1.) Extending from one to the other of the plates B and C and formed in them by being cored out when cast are the several openings D and D', which connect the space above the diaphragms B and C with the hollow space in the casting A below them. The upper edge of the casting A is formed with a projecting annular shoulder E, the edge of which is flared out radially and properly faced off to receive the under side of the edge of the circular plate F, which is secured thereto so as to be gas-tight, preferably by having a circular groove $b$ cut in one of the contiguous faces and an annular shoulder $b'$ formed in the other face to fit into it. The casting A is provided in the bottom thereof with an opening $c$, convenient for the insertion of a pipe, by which the strong liquor may be withdrawn therefrom, as hereinafter described. One or more openings $d$ are formed in the side of the casting A, leading from the exterior to the intermediate space between the diaphragm-heads B and C, convenient for the insertion of pipes for conducting the expanded gas thereto from the refrigerating-coils.

The plate F is formed with several staggered circular perforations $e$, (see Fig. 5,) into which are expanded or otherwise secured, so as to be water and gas tight, the lower ends of the open-ended pipes G. The upper ends of these pipes G are similarly secured in the plate H, which is similar in construction and form to the plate F, but inverted and of comparatively smaller diameter, for the reasons as will hereinafter appear. The edge of the upper surface of the plate H is trued off and fitted, as is the edge of the lower surface of the plate F to the upper flared edge of the casting A to the flared edge of the inverted hemispherically-shaped hollow casting I and properly secured thereto.

In the hollow space within the casting I, parallel to the inclosing plate H, is secured the diaphragm-scattering plate K, which is provided with a group of perforations immediately over each of the upper ends of the tubes G. The casting I is formed with an opening in the upper portion thereof, into which is suitably secured the end of a pipe $i$ for conducting the weak liquor thereto from the retort or generator. It is also provided with an opening near the top for the insertion of the end of the purge-pipe $x$. The plates F and H are similarly formed with transversely-extending ribs $k$ (see Fig. 5) for strengthening the same, and several, preferably three, as shown in Fig. 5, knee-shaped projections $u$, suitable for securing thereto the ends of the double-ended assembling bolts L for bracing and staying the two plates F and H.

In two staggered perforations in the upper diaphragm head C of the casting A are secured in some manner suitable to make the joint gas-tight the short pieces of pipe M, extending upwardly. The position of these perforations in the head C, and therefore the nozzle-pipes M secured therein, is immediately below the lower ends of the tubes G, bringing their centers in line.

Into the tubes G are fitted peculiarly-formed obstruction plugs or castings N, N', and N'', the general form of which is shown in the sections thereof in Fig. 2. They are similar, their office being the same, with these slight details of difference: The upper one is provided with laterally-projecting finger-pieces $n$, as shown in Figs. 2 and 6, overlapping the ends of the tubes G when placed therein and acting as a support for the devices as a whole within the tubes G, as shown in Fig. 2, in the lower one N'' the hub-formed portions O and O', which appear in the lower petticoat portion of N and N', are lacking. The upper portions of these obstruction-plugs N, N', and N'' are formed cup-shaped and are connected with the lower open petticoat portions by a series of circularly-placed holes $r$. (Shown in sections in Fig. 2 and 7.) If in the operation of the absorber, as hereinafter described, any liquor seeps through between the sides of the plugs N, N', and N'' and the tubes G, it will enter a circumferential recess $o$ cut about midway in their length in the sides of the plugs. Leading from the circumferential recess $o$ to the hollow space within the lower petticoat portion are formed the series of obliquely-placed holes $r'$. (Shown in Figs. 2 and 9.) The plugs N and N' are connected together by having the upper end of a pipe P screwed into the center of the hub O of N and the lower end screwed into a central hole in the base of the upper cup portion of N'. N' and N'' are similarly connected together by a pipe P', dividing the length of the tubes G approximately equally, so that when all are joined together and placed within the tube G, supporting the whole by allowing the projections $n$ to rest on the upper end of the tube G, as shown in Fig. 2, the petticoat portion of the lower one N'' will extend somewhat below the bottom end of the tube G, permitting the end of the nozzle-tubes M to project up into the same.

It will be understood that it is intended to supply each of the tubes G in the absorber with a device similar to that just described and illustrated in Fig. 2.

The upper ends of the nozzle-tubes M and of the connecting-pipes P and P', which extend somewhat beyond the hubs O and O', into which they are screwed, are each formed with several series, preferably two, as shown, of radial holes $s$, preferably opposite the series of holes $r$ and $r'$.

Surrounding the whole, with its lower end hermetically secured to the bottom plate F, is the cylindrical casing R R', which is divided transversely about midway in its length, so that the upper portion R' can be conveniently removed, exposing the head I and the upper portions of the tubes G. The casing R R' is provided with an inlet-opening $t$ near the bottom thereof and an outlet-opening $t'$ near the top.

The gages T and S are intended to show, respectively, the standing height of the liquor in the base-casting A and in the upper sections of the tubes G.

The operation of the absorber is as follows: Cold water is fed into the casing R R' through the opening $t$ and allowed to overflow at $t'$, thereby filling the spaces and completely surrounding the tubes G with cold water. The weak liquor from the retort, after having been properly cooled, is allowed to enter by the pipe $i$. The perforations in the plate K will distribute the liquor and allow it to drop down onto the plugs N in the top of the tubes G. At the same time the expanded gas from the refrigerating-coils or cooling-box is allowed to enter by the openings $d$ and allowed to freely expand within the comparatively large gas-space between the heads B and C and up through the nozzle-tubes M. The natural tendency of the gas will be to ascend up through the unobstructed passage afforded by the pipes P' and P. The gas in thus ascending through the pipes P' and P will naturally spread at each break in the pipes, as at the upper ends of the nozzles M and the upper ends of the pipes P' and P, and through the radial holes $s$. The weak liquor which is let down onto the plug N will trickle through the holes $r$ therein into the next section below and be practically sprayed into the gas there, mingling with and absorbing the gas, and thus becoming partially saturated. As before stated, if any of the liquor should seep through between the sides of the upper end of the plug N and the tube G, it will still find its way into the presence of the gas through the holes $r'$. The holes $r$ and $r'$ are so placed as to be radially beyond the margin of the ends of the tubes P P' and nozzle-tubes M, so that none of the liquor will be likely to find its way down these tubes. This process of spraying the liquor is again repeated at the upper end of P' and of M, thereby insuring a thorough saturation of the liquor before it reaches the upper diaphragm-head C as strong liquor. The strong liquor is drawn off by a pump or other suitable means through the opening $c$ and delivered to the retort or generator. I do not wish to confine myself to three obstruction-plugs N, N', and N'', as shown, if I find that the maximum saturation of the liquor requires a greater number, or if I find I can accomplish the desired result with less. The sizes of the combined openings $r$ and $r'$ in the plugs N, N', and N'' are to be so proportioned that there shall be more or less of a head of liquor on the plugs N' and N'', as indicated in Fig. 2, in order to give a certain amount of pressure and consequent velocity to the jets of liquor as they issue through the holes $r$ therein, which will cause more or less suction around the ends of the pipes P P' and the nozzle M, thereby assisting the flow of the gas. The gage S will indicate this head in the upper section of the tubes G, furnishing an indication whereby the supply of weak liquor to the absorber may be regulated. Conducting the expanded gas up through the pipes P' and P, which are surrounded by liquor, any cold remaining in the gas may be utilized to counteract the heat unavoidably generated by the absorption of the gas by the liquor. As described, the gas is kept distinctly separated from the liquor, weak or strong, except at the points where it can be absorbed by the weak liquor.

It is well known that the metal parts of refrigerating apparatus must be kept clean to insure an economical working of the same. To enable this to be done in my absorber, as well as to conveniently clean the small openings in the obstruction-plugs N, N', and N'' of any obstacles liable to accumulate there, in order to insure a free circulation through all parts of my absorber, I have, as explained, designed the casing R R', so that the upper portion can be removed and the working parts conveniently gotten at.

The gage T is for showing the height of the strong liquor in the base of my absorber to furnish an indicator to the attendant, in order to provide against any of the strong liquor overflowing through the nozzles M into the gas-chamber between the heads B and C and into the gas-supply pipes.

I claim—

1. In an absorber for ammonia-refrigerating and ice-making machines, the combination of one or more vertically-placed tubes, one or more obstruction-plugs fitted within said tubes, said plugs being formed with a series of small orifices extending through the same, a conduction-pipe delivering the weak liquor to the upper end of said vertical tubes, allowing it to flow through the orifices in said plugs, and a gas-induction pipe extending up into the lower end of said tubes, said induction-pipe having openings, permitting the gas to expand at or near the point at which the weak liquor is emitted through the orifices in said plugs, operating substantially in the manner and for the purpose specified.

2. In an absorber for ammonia-refrigerating apparatus, the combination, with a tube or pipe for the expanded gas, said tube perforated at its upper end, of a perforated hood which incloses the upper end of said tube and delivers the weak liquor under a head or pressure, whereby the effect of an aspirator is obtained, substantially as and for the purposes specified.

3. In an absorber for ammonia-refrigerating and ice-making machines, a hollow base-piece for the reception of the strong liquor, an opening for the insertion of an eduction-pipe leading therefrom, a secondary hollow gas-space formed within said base-piece, openings for the insertion of induction-pipes leading to said gas-space, a hollow head-piece for the reception of the weak liquor, provided with an opening for the insertion of an induction-pipe, a tube or tubes connecting the hollow space within the said head-piece with the hollow space within the said base-piece, a perforated obstruction plug or plugs fitted in said connecting-tubes, a conduction-pipe extending from said gas-space within the base-piece into and within the said connecting-tubes, openings in said conduction-pipes at points in the length thereof corresponding with the position of said obstruction-plugs, a casing provided with inlet and outlet openings surrounding said connecting tube or tubes, and gages for showing the level of the liquor in the several parts of the apparatus, the whole combined and operating substantially as described, and for the purposes specified.

4. In an absorber for ammonia-refrigerating or ice-making machines, vertical tubes, to the upper ends of which the weak liquor is delivered and to the lower ends of which the expanded gas is conducted by pipes projecting upwardly within said tubes, in combination with obstruction-plugs fitted within said tubes, said plugs consisting in an upper cup-shaped portion and a lower petticoat-shaped portion, perforations extending from the space within said upper portion to the space within said lower portion, a circumferential recess formed in the sides thereof, and perforations extending from said circumferential recess to the space within said lower portion, operating substantially as described, and for the purposes specified.

5. In an absorber for ammonia-refrigerating and ice-making machines, vertical tubes, to the upper ends of which the weak liquor is delivered and to the lower ends of which the expanded gas is conducted by pipes projecting upwardly within said tubes, in combination with obstruction-plugs fitted within said tubes, said plugs consisting in an upper cup-shaped portion and a lower petticoat-shaped portion, perforations extending from the space within said upper portion to the space within the said lower portion, a circumferential recess formed in the sides thereof, and perforations extending from said circumferential recess to the space within said lower portion, combined with a central perforation extending through the same suitable for the insertion of the lower end of a gas-conduction pipe, and a central hub formed within said lower petticoat portion convenient for receiving the upper end of a gas-conduction pipe, substantially as described, and for the purposes specified.

6. In an absorber for ammonia-refrigerating and ice-making machines, a hollow head-piece for the reception of the weak liquor, an induction-pipe leading to the upper portion thereof, vertical tubes, the upper ends of which are secured in perforations in the lower portion of said head-piece, in combination with a plate secured within said hollow head-piece provided with perforations immediately over the ends of said tubes, substantially as described, and for the purposes specified.

7. In an absorber for ammonia-refrigerating and ice-making machines, a hollow base-piece for the reception of the strong liquor provided with an opening suitable for the insertion of a pipe in the bottom thereof, and perforations in the upper portion thereof, into which are inserted the lower ends of vertical tubes, in combination with a hollow gas-space formed within said base-piece, induction-openings leading to same, and eduction-openings, into which are inserted pipes extending into the lower end of said vertical tubes to a point above the normal level of the liquor within said base-piece, substantially as described, and for the purposes specified.

8. In an absorber for ammonia-refrigerating apparatus, the combination, with a succession of tubes for the expanded gas, said tubes being perforated at their upper ends, of a series of perforated hoods which inclose the ends of their respective tubes, and an outer tube, wherein the said perforated hoods are arranged at intervals to form obstruction-blocks and cause the waste liquor to be successively sprayed under pressure into the expanded gas escaping from the central tube, substantially as and for the purposes specified.

In testimony whereof I have affixed my signature, in presence of two witnesses, this 26th day of January, 1891.

NILS JOHNSON.

Witnesses:
J. W. CROOKES,
A. RAMEL.